Patented Nov. 8, 1927.

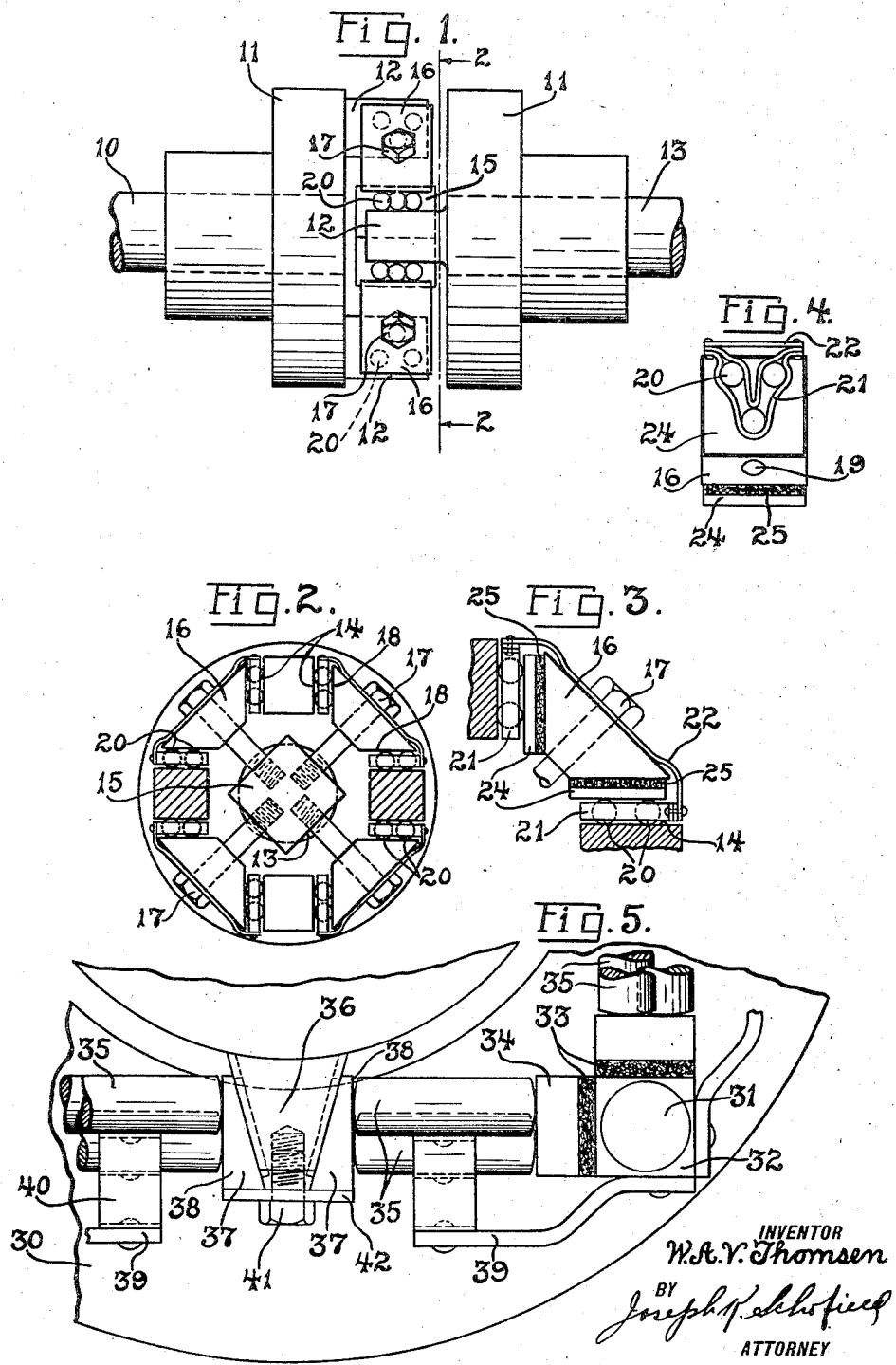

1,648,078

UNITED STATES PATENT OFFICE.

WILLIAM A. V. THOMSEN, OF PLAINFIELD, NEW JERSEY.

FLEXIBLE COUPLING.

Application filed June 29, 1925. Serial No. 40,286.

This invention relates to flexible couplings of the Oldham type for connecting shafts slightly out of alignment.

An object of the present invention is to provide a coupling of the above type in which balls, or members having portions of spherical surfaces, are interposed between surfaces on an intermediate floating member and surfaces on members attached to the adjacent ends of the shafts.

Another object of the invention is to provide means for adjusting bearing members forming parts of the intermediate member to eliminate lost motion between parts of the coupling and to compensate for wear.

A still further object of the invention is to provide means for absorbing shocks during operation by interposing non-metallic material such as leather, wood, etc., between certain of the parts of the coupling.

With these and other objects in view my invention consists in the features of construction and operation set forth in the following specification and illustrated in the accompanying drawing:

In the drawing:

Figure 1 is a longitudinal view of one form of coupling made according to the present invention.

Fig. 2 is a transverse sectional view of the coupling shown in Fig. 1 taken upon line 2—2 thereof.

Fig. 3 is a view of one of the members forming the floating intermediate or cross piece.

Fig. 4 is an end view of the parts shown in Fig. 3, and

Fig. 5 is a fragmentary view of a modified form of the invention showing members having portions of spherical surfaces only used in place of the balls shown in Figs. 1 and 2.

In the above mentioned drawing I have shown but two embodiments of the invention which are now deemed preferable, but it is to be understood that changes and modifications may be made within the scope of the appended claims without departing from the spirit of the invention.

Briefly, and in its broadest aspect, my invention comprises the following principal parts: first, similar driving and driven members adapted to be attached to the adjacent ends of shafts and having diametrically opposite projections outstanding therefrom; second, an intermediate floating member comprising a hub member having four wedge members adjustably secured thereto; and third, balls, or other members having spherical surfaces, adapted to be interposed between plane bearing surfaces on the projections and the wedge members.

Referring more in detail to the figures of the drawing, I provide a shaft 10 which may be assumed to be the driver with a member 11 keyed directly thereto and having outstanding projections 12 diametrically opposed thereon. Another shaft 13, which may be assumed to be the driven shaft, is also provided with a similar member 11 having outstanding projections 12 thereon. The projections 12 formed on these members 11 have plane surfaces 14 parallel to each other on opposite sides and disposed parallel to the axis of the shaft 10 or 13 to which the member 11 is attached. When in operative position the projections 12 on shafts 10 and 13 are positioned at right angles to each other.

Disposed between the two members 11 on the shafts 10 and 13 is a central hub member 15 to which four wedge shaped members 16 are attached by adjustable means such as the screws 17 shown clearly in Fig. 2. Each of these wedge members 16 has bearing surfaces 18 at right angles to each other and a hole 19 passing through it for the adjusting screw 17. As shown in Fig. 2 the wedge members 16 are disposed between projections so that each wedge member 16 lies between a projection 12 on each of the members 11 attached to the shafts 10 and 13. Between the contiguous bearing surfaces 14 and 18 on the projections 12 and wedge members 16 are disposed balls 20 preferably three being used between each pair of bearing surfaces 14 and 18. These three balls 20, in the embodiment of the invention shown in Figs. 1 to 4, between each pair of bearing surfaces 14 and 18 are positioned out of alignment with each other so that they assume the positions at the angles of a substantially equilateral triangle. The balls or other spherical members 20 may be retained in proper relative positions by a retainer 21 partially surrounding each of the balls 20 and attached to one of the wedge members 16 by a flexible strip of metal 22.

With the parts of the coupling assembled as shown in Figs. 1 and 2 the shafts 10 and 13 are permitted to move axially a small amount, and to rotate at uniform angular velocity even when slightly out of alignment. Also this action can take place without any sliding action between the bearing surfaces 14 and 18 on either axial movement between the shafts 10 and 13 or angular movement between the shafts 10 and 13, as either movement when the shafts are out of alignment will cause the balls 20 to roll upon their bearing surfaces.

Preferably each of the wedge members 16 is adjustably attached to the central hub member 15 by means of a suitable screw 17. By adjusting these screws 17 the wedge members 16 may be moved toward or away from their common axis and thus lost motion between the balls 20 and their bearing surfaces 14 and 18 may be eliminated. Also by this same adjustment any wear taking place on the balls 20 and the bearing surfaces 14 and 18 may be taken up.

Fig. 3 shows in detail a preferred form of wedge member 16 in which bearing strips 24 are formed separately from the wedge members 16 proper and attached thereto so that a thickness of non-metallic compressible material 25 is interposed. By means of this material 25 such as wood, leather, fibre, etc., shocks are absorbed and the smooth and quiet operation of the shafts 10 and 13 is enhanced.

Fig. 5 shows fragmentarily a modification of the invention in which the floating intermediate member is a different type. As shown this member is in the form of a ring 30 having cylindrical projections or pins 31 outstanding therefrom. Four of these pins 31 are provided on which are mounted blocks 32 which may have a layer 33 of shock absorbing material on sides at right angles to each other to which bearing strips 34 are attached. These bearing strips 34 have their outer or free surfaces carefully finished to form bearing surfaces for members 35. Preferably three of these members 35 are provided adjacent the bearing strips 34. The ends of the members 35 are rounded so that the opposite ends form part of a spherical surface having a diameter equal to the length of the member.

It will be understood that the shafts 10 and 13 will have members similar to those shown at 11 when the intermediate member 30 shown in Fig. 5 is used. The projections formed on members 11 may, however, be differently formed than as shown in Fig. 3. Instead of the projections having opposite sides for bearing surfaces they may be wedge shape as shown at 36. On the sides of these projections 36 are slidably mounted members 37 which may be suitably dovetailed to the projections 36. The opposite outer surfaces 38 of the members 37 on each projection 36 are, as shown, parallel. These surfaces 38 form the bearing surfaces for the members 35.

It will be seen that members 35 will be disposed upon opposite sides of each of the projections 36, two of which are on each of the members fixed to the driving and driven shafts. Each of these members 35 will bear against one of the bearing surfaces 34 on the blocks 32 mounted on the pins 31, of which there will be four equally spaced about the ring 30. Flexible members 39 may be attached to the blocks for retaining the members 35 in proper position. Preferably members 39 have extensions secured thereto for attaching them to the members 35, as shown at 40. A screw 41 threaded into each of the projections 36 provides means for adjusting members 37 to take up wear upon the spherical members 35 and bearing members 34 and 37. Between the head of each of the screws 41 and the members 37 may be disposed a small plate 42.

What I claim is:

1. A flexible coupling of the Oldham type comprising in combination, members adapted to be attached to the adjacent ends of shafts and an intermediate member adapted to be disposed therebetween, wedge members on said intermediate member, said members attached to the shafts and the wedge members on said intermediate member having cooperating plane bearing surfaces, rolling members interposed between adjacent plane bearing surfaces, and means to adjust said wedge members relative to each other to eliminate lost motion.

2. A flexible coupling of the Oldham type comprising in combination, members adapted to be attached to the adjacent ends of shafts and an intermediate member adapted to be disposed between them, said members attached to the shafts and said intermediate member having plane bearing surfaces, rolling members interposed between adjacent bearing surfaces, and resilient shock absorbing means on said intermediate member disposed adjacent certain of said bearing surfaces.

3. A flexible coupling of the Oldham type comprising in combination, members adapted to be attached to the adjacent ends of shafts and an intermediate member adapted to be disposed between them, said members attached to the shafts and said intermediate member having bearing surfaces, rolling members interposed between adjacent bearing surfaces on said members, resilient shock absorbing means on said intermediate member disposed adjacent said bearing surfaces thereon, and means to adjust said bearing surfaces relative to each other to eliminate lost motion.

4. A flexible coupling comprising in combination, members adapted to be attached respectively to adjacent ends of shafts, diametrically opposite projections thereon having bearing surfaces on their sides, an intermediate floating member comprising a central hub and members attached thereto having bearing surfaces at right angles to each other, and rolling members disposed between the bearing surfaces on the projections and the bearing surfaces on the intermediate member.

5. A flexible coupling comprising in combination, members adapted to be attached respectively to adjacent ends of shafts, diametrically opposite projections thereon having parallel bearing surfaces on their opposite sides, an intermediate floating member comprising a central hub and members attached thereto having bearing surfaces at right angles to each other, rolling members disposed between the bearing surfaces on the projections and the bearing surfaces on the intermediate member, and retaining members for said rolling members.

6. A flexible coupling comprising in combination, members adapted to be attached respectively to adjacent ends of shafts, diametrically opposite projections thereon having parallel bearing surfaces on their opposite sides, an intermediate floating member comprising a central hub and wedge members attached thereto having bearing surfaces at right angles to each other, rolling members disposed between the bearing surfaces on the projections and the bearing surfaces on the intermediate member, and means to radially adjust said wedge members.

7. A flexible coupling comprising in combination, members adapted to be attached respectively to adjacent ends of shafts, diametrically opposite projections thereon having bearing surfaces on their sides, an intermediate floating member adapted to be disposed between said first mentioned members, parts formed on said intermediate member adapted to be adjustable toward and from the central axis of said intermediate member and having plane bearing surfaces thereon, and rolling members disposed between the bearing surfaces on the projections and the bearing surfaces on the intermediate member.

8. A flexible coupling comprising in combination, members adapted to be attached respectively to adjacent ends of shafts, diametrically opposite projections thereon having parallel bearing surfaces on their opposite sides, an intermediate floating member adapted to be disposed between said first mentioned members, bearing surfaces on parts of said intermediate member adapted to be adjustable toward and from the central axis of said intermediate member, balls disposed between the bearing surfaces on the projections and the bearing surfaces on the intermediate member, and retaining members for said balls.

9. A flexible coupling comprising in combination, members adapted to be attached respectively to adjacent ends of shafts, diametrically opposite projections thereon having parallel bearing surfaces on their opposite sides, an intermediate floating member adapted to be disposed between said first mentioned members, bearing surfaces normal to each other on parts of said intermediate member adapted to be adjustable toward and from the central axis of said intermediate member, and rolling members disposed between contiguous bearing surfaces on the projections and the bearing surfaces on the intermediate member.

In testimony whereof, I hereto affix my signature.

WILLIAM A. V. THOMSEN.